United States Patent [19]

Graube

[11] E Patent Number: Re. 32,950

[45] Reissued Date of Patent: Jun. 13, 1989

[54] FUNNEL TEACHING METHOD AND APPARATUS

[76] Inventor: Peteris E. Graube, 1145 Collingdale Ave., N.W., Grand Rapids, Mich. 49504

[21] Appl. No.: 154,791

[22] Filed: Feb. 10, 1988

Related U.S. Patent Documents

Reissue of:

[64] Patent No.: 4,571,191
Issued: Feb. 18, 1986
Appl. No.: 632,617
Filed: Jul. 19, 1984

U.S. Applications:

[63] Continuation-in-part of Ser. No. 517,973, Jul. 28, 1983, abandoned.

[51] Int. Cl.[4] ..... G09B 23/02; G09B 23/12

[52] U.S. Cl. ..... 434/126; 248/94; 434/188; D7/68

[58] Field of Search ..... 434/126, 188, 211; 422/99, 102; 248/94; D7/68

[56] References Cited

U.S. PATENT DOCUMENTS

| | | | |
|---|---|---|---|
| D. 153,202 | 3/1949 | Beller | D7/68 |
| D. 158,693 | 5/1950 | Salisbury, Jr. | D7/68 |
| 645,199 | 3/1900 | Brooks | D7/68 X |
| 2,929,159 | 3/1960 | Feldhake | 434/211 |
| 3,071,297 | 1/1963 | Lee | 222/462 |
| 3,173,218 | 3/1965 | McAlister | 434/211 |
| 3,540,135 | 11/1970 | Alcosser et al. | 434/211 X |
| 3,672,073 | 6/1972 | Pilorusso | 434/211 |
| 3,837,094 | 9/1974 | Mazurek | 434/126 |
| 3,995,380 | 12/1976 | Nasir | 434/188 |
| 4,048,731 | 9/1977 | Baguiro | 434/188 |

FOREIGN PATENT DOCUMENTS

| | | | |
|---|---|---|---|
| 22006 | 8/1964 | United Kingdom | 434/211 |

OTHER PUBLICATIONS

Chicago Apparatus Co. Catalog 1954, pp. 417, 421, 427 and 894.

*Primary Examiner*—William H. Grieb
*Attorney, Agent, or Firm*—Price, Heneveld, Cooper

[57] ABSTRACT

A method and apparatus for teaching physical principles of fluid flow and [the] mathematical principles [of], *such as* integration, by concrete, measurable examples comprised the use of a plurality of teaching funnels each capable of being supported by a mounting mechanism in a stable position over a receptacle. Each funnel has perimetric sidewalls with interior surfaces that conform to equations that will *allow various flow characteristics to be computed, and in preferred embodiments will* provide an integrable function when plugged into the equation for computing the time it takes for the funnel to empty of liquid. The funnels can have a base covering the lower end of the funnel with an outlet orifice formed in the base. The orifice is spaced a predetermined distance away from the sidewalls to achieve a desired outflow rate. The different sidewalls can be formed of different shapes as long as each conforms with a formula that [yields an] *allows various flow characteristics to be computed, and in preferred embodiments that yield* integrable [function] *functions* when plugged into the equation for computing the time it takes for the funnel to empty of liquid. A simple configuration is a funnel with a rectangular horizontal cross-section, three straight sidewalls, and one curvilinear sidewall. The funnels also can be formed with a circular or otherwise formed horizontal cross-section and can be formed in multiple vertical levels. The funnel top can be open or closed and pressurized to vary the pressure on the liquid in the funnel.

46 Claims, 5 Drawing Sheets

FUNNEL TEACHING METHOD AND APPARATUS

Matter enclosed in heavy brackets [ ] appears in the original patent but forms no part of this reissue specification; matter printed in italics indicates the additions made by reissue.

CROSS REFERENCE TO RELATED APPLICATION

This is a continuation in-part of applicant's copending application Ser. No. 517,973, filed July 28, 1983 and now abandoned.

BACKGROUND OF THE INVENTION

This invention relates to a teaching method and apparatus for [calculus and fluid flow] *mathematics and science* classes comprising the use of fluid flow through a plurality of variously configured funnels in order to physically demonstrate physical principles of fluid flow and [the] mathematical principles [of] , *such as* integration.

Math anxiety, or fear of mathematics, is perhaps nowhere more evident than in the calculus classroom. Calculus, with its incremental iterations, is one of the great stumbling points of mathematical conceptual development, standing alongside division, the equal sign, and modern algebra in elusiveness. Calculus students, typically 17-20 years of age, are principally concrete thinkers (including so-called hortizontal decalage of formal thinkers), who are persons who have difficulty learning mathematical principles in the first instance in terms of abstract symbols representing variables. In more formal terms, such calculus students lack equilibrated cognitive structures-they fail to account for multiple situational possibilities. For concrete thinkers, learning mathematical principles in terms of abstract symbols is facilitated if the principles are first demonstrated by a model or concrete example. Again, in more formal terms, concrete particulars are propaedeutic to incipient learning cycles foundational to semeiotic or symbolic abstraction; that is, only after having established a functionally assimilative cognitive scheme via motoric activities are concrete thinkers able to proceed to semeiotic empirical generalization. Without a functionally assimilative cognitive scheme, conceptual verbalizations tend to be idiosyncratically interpreted by each student, rendering purely semeiotic exposition vague and ambiguous and learning sporadic and superficial. Nonetheless, calculus, elusory as it is, is principally taught semeiotically (symbolically), approaching students as though formal thinkers, able to exhaustively appreciate manifold situational variables and spontaneously ratiocinate hypotheses as to eventualities, which chiefly they are unable to do, though origins of the symbolic function are acquired at the sensorimotor stage. Thus high school and college students of calculus often grapple with the semeiotically expounded infinitesimal iterations of differential and integral calculus in vain, emerging unable to apply the rotely memorized procedures to concrete problems and confused. It is one of our biological inheritances that confusion produces emergency anxiety, along with the attendant defensive measures of flight, fright, and freezing. Hence, the etiology of math anxiety.

The presently available art in calculus teaching aids is comprised of a segmented cone statically illustrating the conic sections, a planar panel upon which points and line segments may be joined into static three-dimensional figures, and static geometric shapes generated by a revolution of an area bounded by a curve which may be serially mounted upon support braces; each of these teaching aids is wholly visual and meant to be handled solely by the teacher. The essentially concretely thinking students are relegated to passively cognizing various shapes exclusively through their visual perceptual fields. The present aids offer no channels of learning through concrete manual manipulation.

Projects involving serial task accomplishment and problem solving are presently being integrated into school system curriculums. The leap from rote learning to noetic fluency is much like the difference in language use between a listener and speaker. The rotely learning student, deficient in organizational persistence and unbound by prior constraints, resorts to episodic empiricism, constructing hypotheses in potshot manner without justification and with no differentiation of the passively received information. In contrast, projects allow the student to put things together for himself, leading him to discovery. Through discoveries, the student constructs hypotheses via cumulative constructionism, wherein the student discovers regularities and relatedness, avoids information drift, and locates constraints giving shape to an hypothesis. The principal problem of human memory is not storage but retrieval, not recognition but spontaneous recall. A given project encourages the student to recast a difficulty into a form that he knows how to work with, imposing a workable form upon the difficulty, to transform information related to the task for immanent transmittal, resulting in information differentiation and reducing the aggregate subjective complexity by imbedding it into a cognitive process or scheme the student has constructed for himself, thereby making the material more accessible for retrieval. The very attitudes and activities that characterize figuring out or discovering things for oneself also conserve memory. The key to retrieval is organization, and good organization is achieved by problem solving. Discovery learning further engenders competence motivation where growth and maintenance of mastery become central and dominant, whereas extrinsically motivated students become overachievers, lacking capacity for transforming learning into viable thought structures and analytic ability. One learns the working heuristics of discovery only through the effort of inquiry, the exercise of problem solving, and the completion of projects.

A further shortcoming of the presently available calculus teaching aids is that they do not lend themselves to projects of serial tasks and problem solving; they are limited to purely demonstrational teaching strategies by the teacher. That is, the present aids are not adapted to presenting students with a project to be accomplished, and are therefore of little utility to school systems developing curriculums of projects.

Joint effort in classrooms by student groups upon tasks and problems provides for interpersonal interactions between the students. In such interactions, views are limned, questioned, and defended, leading to argumentation, opinions being justified, and thought being clarified. Language thus serves to internalize the resultant views into a compact experiential category. The students are forced to become more coherent, limpid, and logical as a result of joint classroom effort.

The prior calculus teaching aids are limited to teaching strategies wherein the teacher is the exclusive personality manipulating and expounding upon the aids. The presently available teaching aids are inapt for offering avenues of teaching strategies involving interaction or involvement between students.

Another drawback of the presently available art in calculus teaching aids is that it deals exclusively in illustrating static geometric shapes, curves, and surfaces. Yet calculus is uniquely adapted to deal with dynamic quantities and variating factors. The available calculus teaching aids illustrate forms, quite immobile, and are useless in demonstrating the proprieties of the calculus in dealing with time-dependent variation and ensuing transitory states.

A further shortcoming of presently available calculus teaching aids is that derived results of integration are not quantitatively testable. The static forms simply illustrate how to qualitatively set up an integral, but are unsuitable to empirically verify calculated results. Hence students are uncertain about the tenuous validity of the theory and hesitant of the accuracy of their own calculations.

SUMMARY OF THE INVENTION

One of the primary objects of the instant invention is to provide a teaching system for *mathematics and science classes, such as* high school and collage calculus classes and other classes concerning fluid flow, which will obviate the above objectionable features of existing known prior art devices.

A further object of this invention is to provide tactual interface devices for student of *mathematics and science, such as in* calculus and fluid flow classes, whose principal assimilative cognitive scheme is motoric.

A further object of the invention is the provision of a calculus teaching system that is incorporable as an heuristic project into the project curriculums of school systems.

Still another object of this invention is to provide a teaching system for *mathematics and science classes, such as for* calculus classes and other classes involving flow of fluids, that is adaptable to a teaching strategy wherein students can be divided into groups to mutually solve the serial tasks with the ensuing interpersonal communications rendering students more coherent, limpid, and logical, and the experience compactly internalized.

This invention contemplates, as a still further object thereof, the provision of a teaching system illustrating the unique ability of calculus in dealing with time-dependent variation and ensuing transitory states so as to promote more knowledgeable and adroit selectivity and establish functional editorial heirarchies of timedependent environmental messages within the cognitive structures of the students.

It is another object of the instant invention to provide a teaching aid which analogically verifies the results of *mathematics, and in particular* calculus and fluid flow theory and calculations, affording immediate quantitative feedback to the students as to the integrity of their knowledge and method.

In its preferred embodiment, the present invention is a teaching system comprised by a set of at least three types of variously configured funnels together with a stand, a beaker, and attendant instructions and suggested teaching strategies, offering many advantages over prior art. It permits students of *mathematics and science, such as* calculus, opportunity to motorically manipulate and analyze *various shapes and volumes, such as* integrable shapes and volumes, providing internalization of instructor narrative and generation of solo interior narratization, allowing moderately novel cognitive accomodation of the notion of incremental iterations and promoting abstraction of incremental iterations into an equalibrated structure of formal thinking so that the notion may be generalized to assimilate situations other than that of fluid flow from the funnels. It is incorporable into school project curriculums, especially spiral curriculums where moderately novel facets of the system may be periodically revisited, progressively elaborated, and cyclically abstracted in grasping new particulars. It is adaptable to teaching strategies dividing classes into independent groups within which students may mutually participate towards accomplishment of the serial tasks. It quantitatively verifies the capacity of calculus to solve timedependent variation of factors. It analogically verifies theoretical integrity and student computational accuracy, attributing to integral operations a phenomenally founded degree of cognitive autonomy and functional relevance.

The funnel teaching system can be utilized in calculus, higher mathematics, engineering, physics, piping design, fluid dynamics, hydraulics, fluid kinematics, and other classes of the like.

The funnels of the instant invention may be formed of moded plastic, laminated fiberglass, metal, cement, wood, or other desirable materials. The funnels require no assembly (other than attachment to the support stand), are durable in use, and contain no moving parts thereby eliminating wear and obsolescence and are inexpensive to maintain. Thus the teaching system is a sound investment for school systems.

Other objects, features, and advantages of the invention will be apparent during the course of the following description. The novel features of the invention are set forth with particularity in the appended claims. The invention is best understood from the following description when read in conjunction with the accompanying drawings. None of the drawings is to scale.

DESCRIPTION OF PREFERRED EMBODIMENTS

Figure 1:
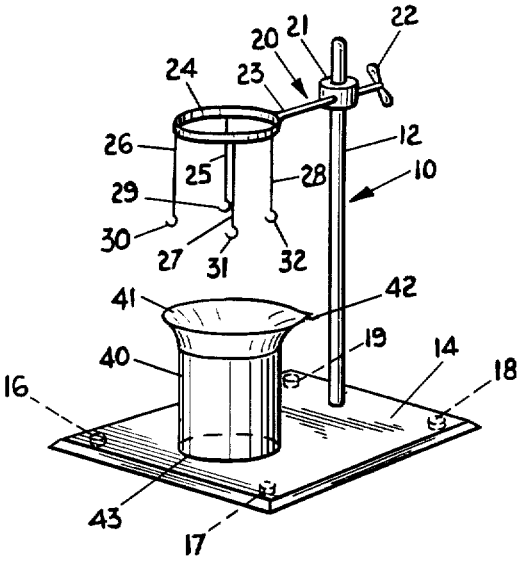
FIG. 1 is a perspective view of the support stand and support mechanism for the funnels and the water receptacle.

FIG. 1 depicts the supplementary hardware to the funnels, namely the funnel support system, consisting of a support stand 10 and a funnel support ring 20, and a water receptacle 40. The support stand consists of an upright arm 12 and a horizontal base 14, to the underside of which are affixed four rubber pads 16, 17, 18, and 19 to assure a non-abrasive and firm grip of the support stand upon the resting surface. The horizontal base 14 and upright arm 12 of the support stand are formed of a desirable material such as metal, wood, or plastic. The upright arm 12 is securely affixed to the horizontal base 14 by an appropriate means at a perpendicular angle to the plane of the horizontal base 14. The funnel support ring 20 consists of a support sleeve 21 that is close-fitting yet loose around the upright arm 12 of the support stand 10, a wing bolt 22 passing through an appropriately sized threaded hole in the distal end of the support sleeve 21 that is capable of being tightened up against the upright arm 12 so as to secure the funnel support ring 20 to the support stand 10, a support arm 23 attaching the support sleeve 21 to an annular ring 24 from which hang four support cords 25, 26, 27, and 28, and four support hooks 29, 30, 31, and 32 securely attached to the support cords 25, 26, 27, and 28 respectively. The support cords 25, 26, 27, and 28 are spaced in equal congruent intervals of 90° around the annular ring 24 to which they are securely attached, with the support cords 25 and 28 proximal to the support arm 23 and spaced at 45° to the support arm 23. The support cords 25, 26, 27, and 28 may be fashioned from wire rope, nylon, or other such durable and flexible material. The water receptacle 40 is fashioned in a beaker-like form, flaring 41 at its top edge, with a spout 42 protruding from the top edge 41, and with rounded bottom edges 43, and is fashioned from appropriate material, such as glass, plastic, or fiberglass laminations.

Figure 2:
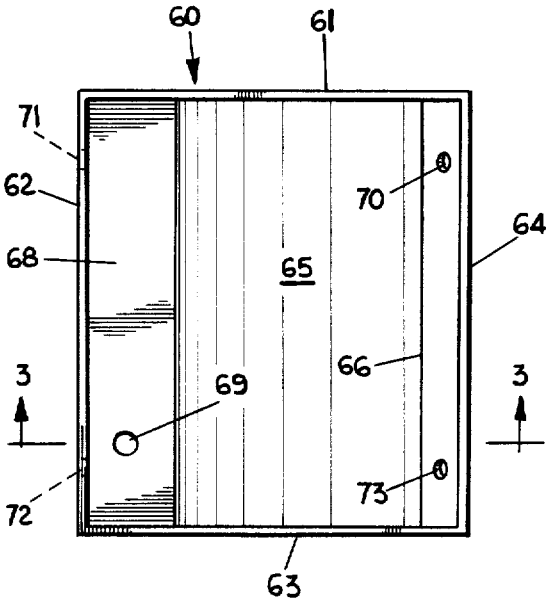
FIG. 2 is a top view of a typical first funnel type of the present invention.
Figure 3:
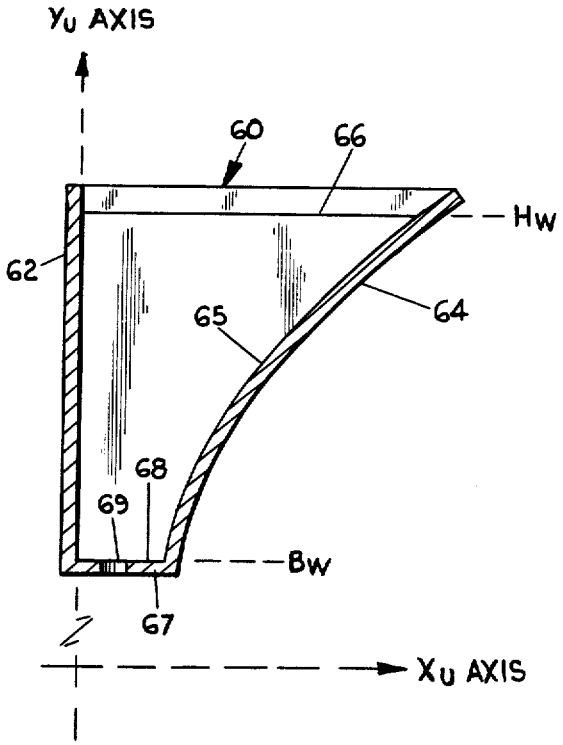
FIG. 3 is an elevational cross-section of FIG. 2 as seen along line 3—3.

FIGS. 2 and 3 depict a typical first funnel type 60 of the teaching system. This funnel type 60 has a rectangular cross-section and consists of three vertical containment walls or sidewalls 61, 62, and 63, a fourth curvilineal containment wall or sidewall 64 having an inside surface 65 formed in accordance with the right cylindrical projection of the graph of the formula $x=f_u(y)$ wherein U is a specific function and x and y are the horizontal and vertical axes respectively. A depth indication line 66 is marked at height $y_u=H_u$. upon the inside surface of the four containment walls wherein w is a specific funnel. The funnel includes a base 67 that is preferably approximately horizontal. The inside surface 68 of the base is located at $y_u=B_w$ through which a circular orifice 69 has been formed, the orifice position can be arbitrary but preferably is spaced away from the sidewalls of the funnel. Four funnel suspension holes 70, 71, 72, and 73 are located above the depth indication line 66 and so positioned as to afford stability to the funnel.

Figure 1A:
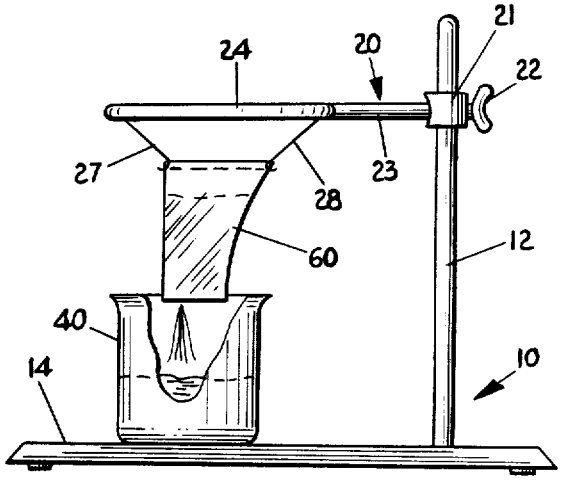
FIG. 1A is a side elevational view showing a funnel suspended in the support mechanism.

To use funnel 60, it is suspended from the support structure in the manner shown in FIG. 1A. As shown, hooks 29–32 on the ends of the support cords attach to the four suspension holes 70–73, respectively, of the funnel and suspend the funnel in a horizontal position over beaker 40. The cords are suspended such that when they are attached to the funnel they are not parallel to each other. This restrains the funnel from swinging back and forth and thereby promotes the stability of the system.

Funnel 60 is used for the purpose of demonstrating the physical principles of fluid flow, [the] mathematical principles [of], *such a* integration, and more specifically for demonstrating the use of integration in calculating the time it takes for the funnel to empty after it has been filled with water or other liquid to the depth indication line.

To fully understand and appreciate the manner in which the funnel system invention is useful in demonstrating *principles of mathematics and sciences, such as* integration, it is pointed out that gravitational discharge of a uniform density, non-compressible fluid from a containment vessel through a constant diameter orifice involves time-dependent variation of the volume rate of flow due to the transient depth of the orifice from the fluid surface, the fluid surface variating in turn with respect to the geometric configuration of the receptacle containment walls and the efflux velocity. Thus, in order to arrive at the emptying time for the vessel, the instantaneous volume must be related to the resultant height of the fluid column by the transverse relationship of the containment walls and the relationship integrated. Therefore each individual vessel containment wall configuration leads to a unique volumetric/elevational relation and ensuing integral.

The formula for calculating the time it takes for a funnel full of a liquid to empty is known and is $$t = -\frac{C}{d_w^2}\int_{y_u}^{B_w} = H_w \frac{dV}{\sqrt{Z_w}}$$

where the variables are defined as follows:

t = time w = a specific funnel configuration $d_w$ the diameter of the outlet orifice $H_w$ = the height of the water in the funnel when full $B_w$ = the height of the bottom surface of the funnel $Z_w$ = the height of the fluid column dV = the incremental change in volume as a function of the height of the surface of the liquid in the funnel C = a constant representative of the coefficient of discharge of the funnel, the characteristics of the liquid, the nature of the liquid flow pattern through the outlet (e.g., turbulent or laminar), and the texture of the inner surface of the funnel. By appropriate selection of funnels, the values of C can be considered to be the same for all funnels without introducing any substantial error in the calculations.

In this equation, two variables, V and $Z_w$, are multiplied together, the orifice diameter remaining constant for a particular funnel w. From this equation, the time it takes for water to empty from any sort of funnel may be calculated by relating a change in the water volume contained within the funnel to a corresponding change in the height of the water level, or vice versa.

The above formula describes an ideal situation. In practice, however, certain perturbances will deviate the observed results from the ideal. The coefficient of discharge will vary for a non-vertical funnel as a function of the magnitude of the fluid column. Furthermore, the above formula assumes an infinitely fluid liquid, which is untrue in the rear world. Calculations from funnel prototypes using water as the flowing fluid indicate initial Reynolds numbers of 3270 within the funnel body and 13,100 at the orifice, implying widespread turbulent distortion of the laminar flow pattern. The occurrance of separation necessarily increases both the resistance to motion and the rate of dissipation of mechanical energy through form drag and viscous shear. Critical R values differ considerably in numerical magnitude owing in part to the effect of the boundary form upon the flow stability and in part to the flow dimension chosen as a length parameter. However, accepting the value of Schiller of 2320 as the critical R value, tests with prototype funnels indicate a critical fluid column height of one half the initial fluid column height, assuming laminar flow in the funnel body results in essentially laminar flow at the orifice regardless of the orifice R value since the wake eddies in the transition zone require three to five diameters before fully developing into turbulence. Thus every time a funnel empties the flow transforms from one of turbulence for half the distance with the ensuing repeatable stalling of the fluid flow, to laminar flow. The flow stall due to turbulence is not random, however, but tends to skew the emptying times of the funnels upwards. Third, the relative influence of the parabolic velocity distribution upon contractions of different relative sizes further influence the coefficient of discharge. Fourth, the boundary roughness of the funnels is the sole criterion for determining boundary resistance of the laminar sublayer, such roughness variating with the material, method, and craftsmanship of manufacture, further skewing the emptying times of the funnels. Considerations of the above perturbances would be within the purview of only advanced courses in fluid dynamics. For less advanced courses, especially courses in calculus with little detailed interest in the mechanics of fluid flow, the above ideal equation would appear to produce calculations shifted from the analog results. Thus, it may be necessary to adjust the value of the constant C empirically from the above ideal equation so that the calculated results correspond most accurately with empirically observed results of actual fluid flow.

The fabrication of some of the funnels of the present invention with a bottom portion or base 67 provides improved correlation between expected emptying times and measured times for various funnel shapes, particularly when a common value for the constant "Constant "C" is assigned for all funnel configurations. The base first makes it possible to provide an orifice of given diameter in the bottom of a funnel of any size and at any place, regardless of the size of the natural funnel base at the lower end, down to a certain minimum.

Desirably, the orifice in the base is selected so that the emptying time is a conveniently measurable duration. An orifice size permitting the funnel to empty in about 10–30 seconds is adequate to provide a time long enough to avoid significant errors by a lack of split second timing. The upper limit is established simply to limit the length of any experiment to a reasonable time.

Another advantage of base 67 is that it makes it possible for the outlet flow characteristics from funnels of various shapes to be the same. In funnel shapes with a streamlined lower end the flow at the outlet without a base would be smooth and laminar producing a rapid emptying time. In other funnels, the shape at the bottom is not so streamlined and there is considerable turbulence induced in the water at the orifice, resulting in a slower emptying time. If a base is placed on the bottom end of at least the streamlined funnels and an orifice formed in the base, the flow characteristics (not predominantly turbulent) are now similar for different funnels. Thus, the emptying times of different funnels are more consistently related to the theoretical emptying times for each particular funnel shape, resulting in a more constant "C" for the different funnels.

Figure 15:
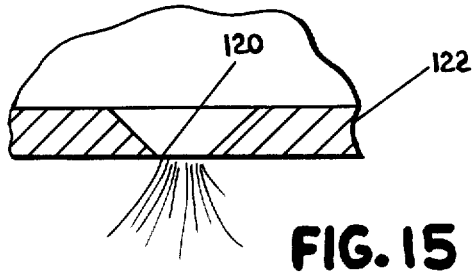
FIG. 15 is a partial cross-sectional view showing a chamferred orifice in a funnel.

The emptying times for individual funnels may be further adjusted to more closely correspond with calculated values (and provide a more consistent "C" value for different funnels) by varying the orifice. Placement away from a sidewall is generally desirable. Also emptying times can be adjusted by varying the shape of the orifice. In FIG. 15 for example orifice 120 of funnel base 122 is chamferred or tapered downwardly and inwardly. This increases the rate of fluid outflow by improving fluid flow characteristics at the orifice without changing the outlet diameter of the orifice. With respect to the sidewalls; placement of the orifice nearer a sidewall tends to lengthen the emptying time of a funnel.

In order for the funnels to be capable of providing a physical demonstration of the principles of *mathematics and science, such as* fluid flow and integration, the formula for the vertical contour of the inner surfaces of the sidewalls at each point around the y axis must be described by a function $f_u(y)$ that can be plugged into the above time formula and provide an *analytically or numerically* integrable function. The contours (and indeed the number) of the various sidewalls can vary from the FIG. 2 and 3 embodiments as long as the contour of each one provides an integrable integrand in the time formula. For ease in setting up class demonstrations and in performing the required integration, three of the walls in the FIGS. 2 and 3 funnel are straight (yielding an acceptably integrable formula) and the fourth can have any other acceptable contour; beginning students will find this funnel type especially helpful in becoming accustomed to the method of solution.

To provide an acceptably *analytically* integrable integrand in the time formula, the interior contour of the funnel must conform with one of the following formulas as a function $f_u$ of $y_u$:

$$f_1 = K_1$$

$$f_2 = K_1(y_2 - B_w)^m + K_2,\ M \epsilon R\ 1$$

$$f_3 = K_1 y_3^m + K_2,\ M \epsilon I\ 1$$

$$f_4 = (y_4 - B_w)\tan\theta + K_1,\ \theta \epsilon R,\ 0^\circ < \theta \leqq 90^\circ$$

$$f_5 = K_1(y_5 - B_w)^m + K_2,\ M \epsilon R,\ 0 < m < 1$$

$$f_6 = \frac{K_1}{y_6^m} + K_2,\ M \epsilon I > 1$$

-continued $$f_7 = K_1(K_5 K_2 \sqrt{y_7 - B_w} + K_3) + K_4$$

$$f_8 + K_1(\sqrt{y_8 - B_w})^m[\log(K_2 \sqrt{y_8 - B_w} + K_3)] + K_4, M \epsilon I$$

$$f_9 + K_1 \sin^m[K_4(\sqrt{y_9 - B_w} + K_2)] + K_3, M \epsilon I$$

$$f_{10} = K_1 Y_{10}^{m+\frac{1}{2}} \sin(K_2 y_{10}) + K_3, M \epsilon I$$

$$f_{11} = K_1 \cos^{-1}[K_4(\sqrt{y_{11} - B_w} + K_2)] + K_3$$

$$f_{12} = K_1 \tan^m[K_4(\sqrt{y_{12} - B_w} + K_2)] + K_3, M \epsilon I$$

$$f_{13} = K_1 \tan^{-1}[K_4(\sqrt{y_{13} - B_w} + K_2)] + K_3$$

$$f_{14} = K_1 \sec^m[K_4(\sqrt{y_{14} - B_w} + K_2)] + K_3, M \epsilon I$$

$$f_{15} = K_1 \sec^{-1}[K_4(\sqrt{y_{15} - B_w} + K_2)] + K_3$$

$$f_{16} = K_1 \sinh[K_4(\sqrt{y_{16} - B_w} + K_2)] + K_3$$

$$f_{17} = K_1 \sinh^{-1}[K_4(\sqrt{y_{17} - B_w} + K_2)] + K_3$$

$$f_{18} = K_1 \cosh[K_4(\sqrt{y_{18} - B_w} + K_2)] + K_3$$

$$f_{19} = K_1 \cosh^{-1}[K_4(\sqrt{y_{19} - B_w} + K_2)] + K_3$$

$$f_{20} = K_1 \tanh[K_4(\sqrt{y_{20} - B_w} + K_2)] + K_3$$

$$f_{21} = K_1 \tanh^{-1}[K_4(\sqrt{y_{21} - B_w} + K_2)] + K_3$$

$$f_{22} = K_1 \coth[K_4(\sqrt{y_{22} - B_w} + K_2)] + K_3$$

$$f_{23} = K_1 \coth^{-1}[K_4(\sqrt{y_{23} - B_w} + K_2)] + K_3$$

$$f_{24} = K_1 \operatorname{sech}[K_4(\sqrt{y_{24} - B_w} + K_2)] + K_3$$

$$f_{25} = K_1 \operatorname{sech}^{-1}[K_4(\sqrt{y_{25} - B_w} + K_2)] + K_3$$

$$f_{26} = K_1 \operatorname{csch}[K_4(\sqrt{y_{26} - B_w} + K_2)] = K_3$$

$$f_{27} = K_1 \operatorname{csch}^{-1}[K_4(\sqrt{y_{27} - B_w} + K_2)] + K_3$$

$$f_{28} = K_4 \sqrt{y_{28} - B_w}\,[f_A(y_{28})] + K_1$$

wherein $f_A(Y28)$ is an integrable function, m, $K_1$, $K_2$, $K_3$, $K_4$, and $K_5$ are independent and arbitrary constants for each funnel w, $y_u \epsilon R$ for each function U, $H_w$ and $B_w$ are independent and arbitrary constants for each funnel w, and the longitudinal (horizontal) length of the curvilineal wall of each funnel, herein defined as $K_6$, is an independent and arbitrary constant for each funnel w.

For exemplary purposes, the time solution of a first funnel type 60 having its curvilineal side wall shaped like the graph of the first equation $f_1$ will be shown using the disc method. Under formula $f_1$, $$dV = X_1 K_6 dy_1$$

wherein $x_1$ is the lateral width of the funnel at $y_1$, $K_6$ is the longitudinal length of the funnel, and $dy_1$ is the incremental depth. In this case $x_1$ is a constant, K1, throughout the length of the funnel.

$$t = \frac{-C}{d_w^2} \int_{y_1}^{B_w} = H_w \frac{K_1 K_6 dy_1}{\sqrt{Z_w}}$$

$$Z_w = y_1 - B_w$$

$$t = \frac{C}{d_w^2} 2 K_1 K_6 (H_w - B_w)^{\frac{1}{2}}$$

The other funnels similarly produce integrable time formulas, although for some the integration calculations are considerably more complex.

Figure 4:
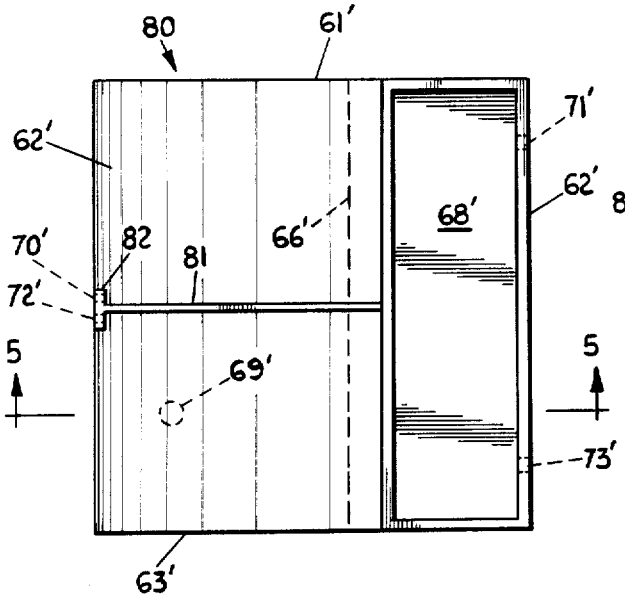
FIG. 4 is a top view of a typical complimentary funnel type of the typical first funnel type.
Figure 5:
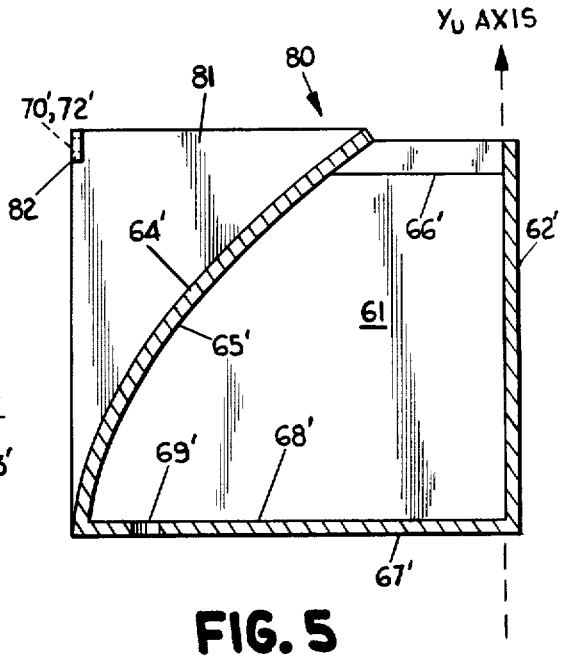
FIG. 5 is an elevational cross-section of FIG. 4 as seen along the line 5—5.

The same principles present in the funnel of FIGS. 2 and 3 can be applied to funnels shaped with sidewalls the contour of which are the complements of the first type shown in FIGS. 2 and 3. This type of shape is shown in FIGS. 4 and 5. Similarly, the same principles apply to the second type of funnel shapes shown in FIGS. 6–8 and a third type of funnel shape shown in FIGS. 9 and 10.

Considering the specific funnels shown in more detail, FIGS. 4 and 5 depict a typical complementary funnel type 80 of the typical first funnel type 60. The graph of the formula $f_u$, where U is a specific function, of the inside surface of the fourth curvilineal containment wall 65 of the first typical funnel type 60 may be shifted horizontally to the opposite side of the $y_u$ axis, where U is a specific function, by adjustment of the additive constant at the far right of each of the formulas $f_u$ as specified above. The resultant inside surface of the curvilineal containment wall of the typical complimentary funnel type 80 is identical in shape to the inside surface of the curvilineal containment wall 65 of the first typical funnel type 60 except that the opposite side of the graph of the specifying formula $f_u$ is utilized as the shape of the inside surface of each fourth curvilineal containment wall. A flat support flange 81 extends outwardly from wall 64 and supports a bracket 82 for two suspension holes for suspending the funnel. Stability is improved by positioning the suspension holes to the side in this manner. Funnel types 80 and 60 are identical in all other functional features and are labeled as such, exept that the numerals for components of funnel type 80 are primed.

Figure 6:
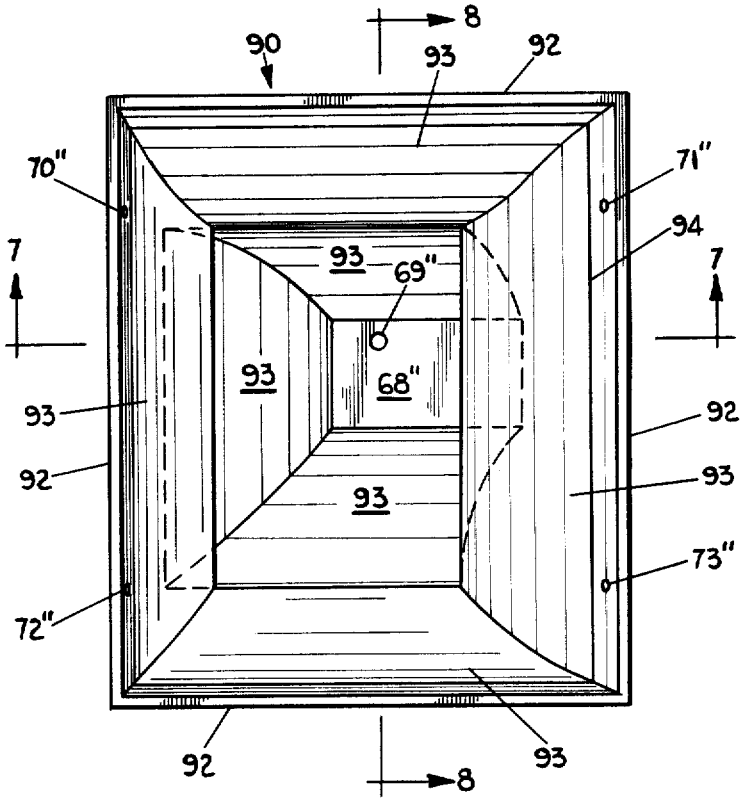
FIG. 6 is a top view of a typical second funnel type of the present invention.
Figure 7:
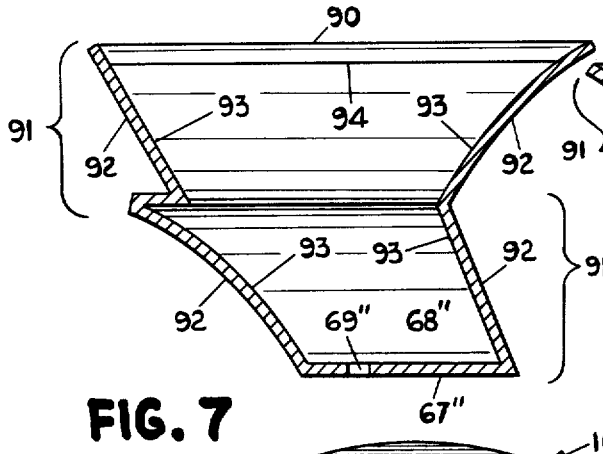
FIG. 7 is an elevational cross-section of FIG. 6 as seen along the line 7—7.
Figure 8:
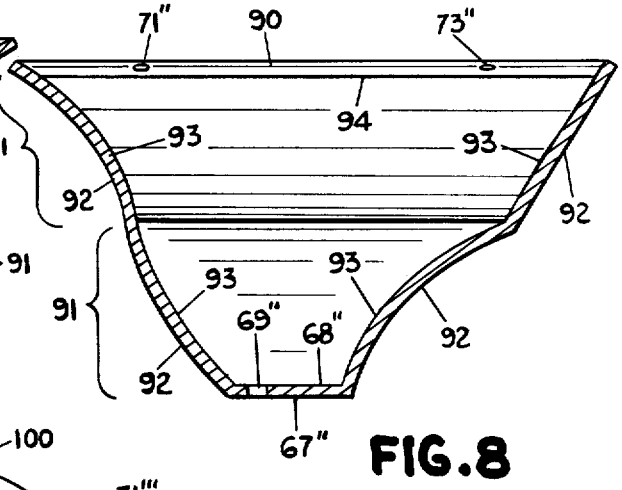
FIG. 8 is an elevational cross-section of FIG. 6 as seen along the line 8—8.

FIGS. 6 to 8 depict a typical second funnel type 90 of the teaching system. This funnel type 90 is an hybrid of various previous funnel shapes, has a polygonal cross-section, and consists of a plurality of containment wall levels 91, each level consisting of a union of a plurality of curvilinear containment walls 92, each containment wall having a possibly unique inner surface 93 formed in accordance with the right cylindrical projection of the graph of the formula $f_u(y)$ wherein U is a specific function, and a depth indication line 94 demarcated at height $y_u = H_w$ upon the inside surface of the containment walls of the uppermost level wherein w is a specific funnel. Funnel types 90 and 60 are identical in all other functional features and are labeled as such, except that the numerals for the components of funnel type 90 are double primed. $f_u$ may assume the forms as defined for funnel 60. The second funnel type 90 may contain more or less than two levels; the pictured funnel is purely illustrative. The second funnel type may contain levels with more or less than four containment walls arranged in any closed polygonal formation whose contribution to the time integral yields an integrable integrand, and the number of containment walls and their arrangement between levels may not be equal nor similar respectively: the pictured funnel is purely illustrative. The advantage of the second funnel type over the first funnel type is that it is suited for more advanced students, making this teaching aid ideal for incorporation into spiral curriculums.

Figure 9:
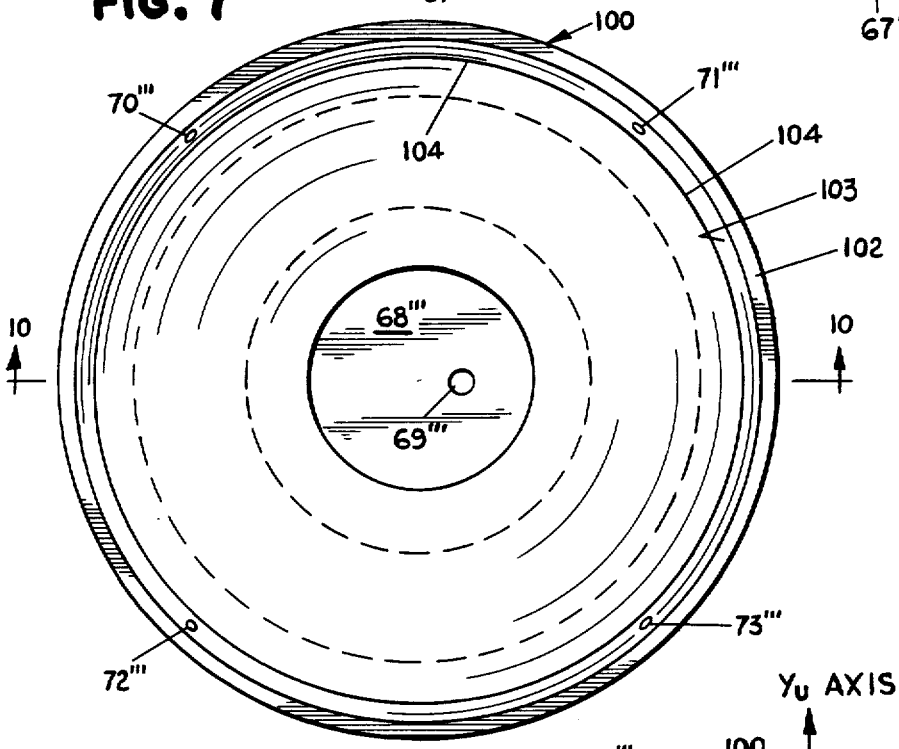
FIG. 9 is a top view of a typical third funnel type of the present invention.
Figure 10:
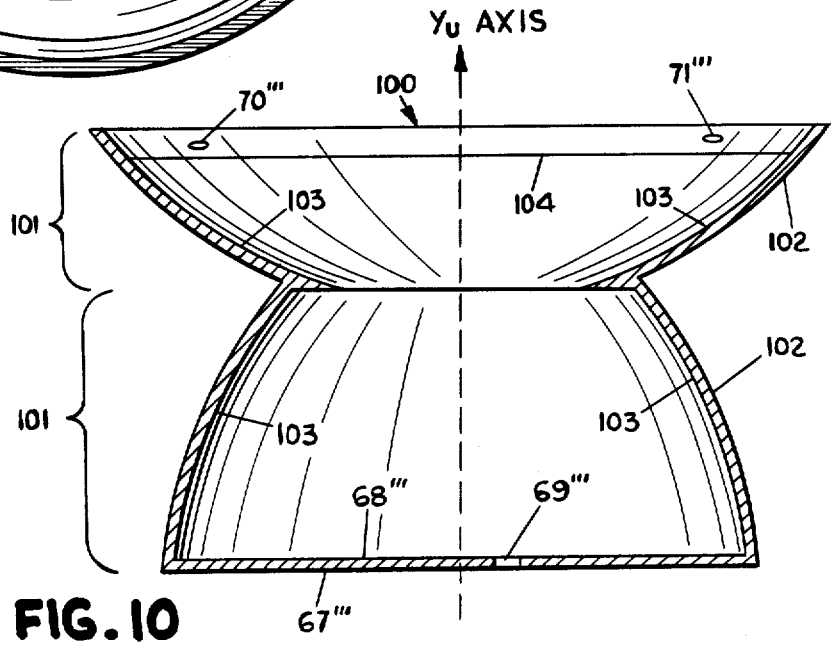
FIG. 10 is an elevational cross-section of FIG. 9 as seen along the line 10—10.

FIGS. 9 and 10 depict a typical third funnel type 100 of the teaching system. This funnel type 100 has a circular cross-section and consists of a plurality of containment wall levels 101, each level consisting of a curvilineal containment wall 102, each containment wall having an inner surface 103 formed in accordance with the circular projection of the graph of the formula $f_u(y)$ wherein U is a specific function, and a depth indication line 104 demarcated at height $Y_u = H_w$ upon the inside surface of the containment wall of the upper most level wherein w is a specific funnel. Funnels 100 and 60 are identical in all other functional features and are labeled as such except that the numerals for the components of funnel type 100 are triple primed. $f_u$ may assume the forms as defined for funnel 60. The third funnel type 100 may contain more or less than two levels; the pictured funnel is purely illustrative.

Figure 11:
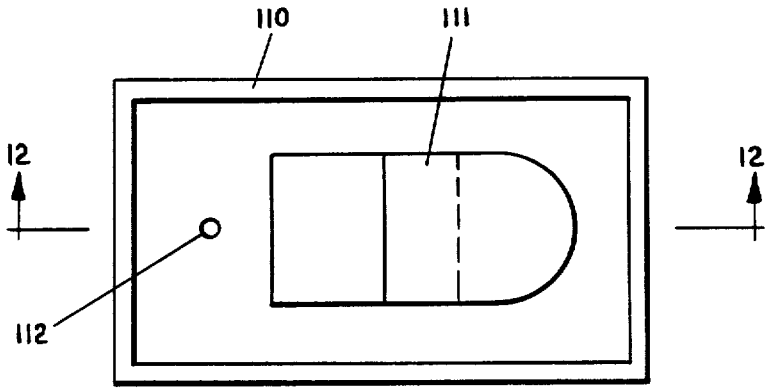
FIG. 11 is a plan view of a funnel with an interior occlusion.
Figure 12:
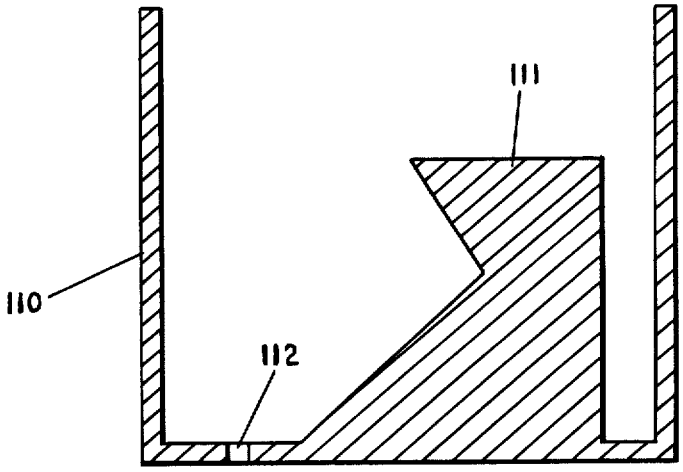
FIG. 12 is a cross section taken along line 12—12 of FIG. 11.

Still another type of teaching funnel is shown in FIGS. 11 and 12. In these figures funnel 110 includes an occlusion 111 within the walls of the funnel. The illustrated funnel 110 is otherwise identical in all of its functional features to funnel types 60, 90, and 100, and the rendered depiction is arbitrary. The occlusion 111 is a volume that displaces water that would normally reside in the funnel when the funnel 110 is filled with water. The water displaced by the occlusion 111 would otherwise add to *particular flow characteristics, such as* the emptying time of funnel 110, in flowing through orifice 112, but with the presence of occlusion 111, the displaced water is not available to add to the *flow characteristics, such as* emptying time, of funnel 110. The occlusion 111 may be formed of any combination of shapes that correspond to equations that, when plugged into the time equation for the funnel to empty, yield an integrable integrand. The resultant time of the occlusion 111 is subtracted from that of the funnel 110 to yield the actual emptying time of funnel 110. A funnel may contain more than one occlusion. Occlusions may also be attached to the sidewalls of its host funnel.

Figure 18:
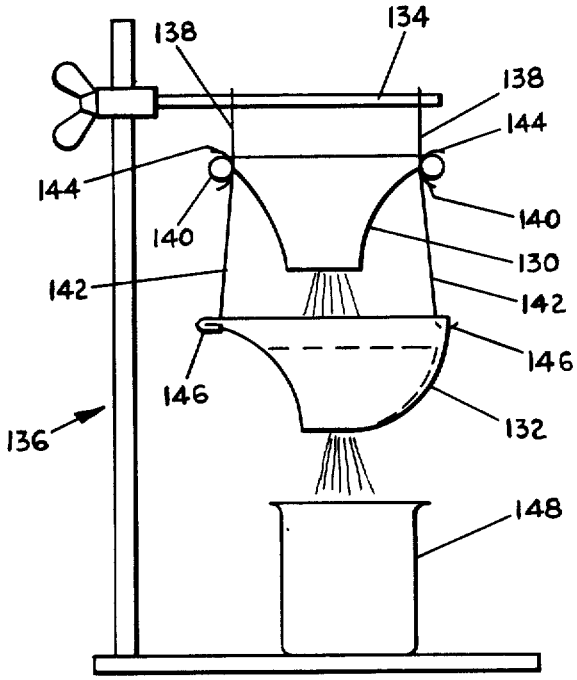
FIG. 18 is a side elevational view of a teaching funnel system employing two funnels in series.

As an additional variation in the teaching funnel system, separate funnels can be positioned in a vertical series, with one funnel 130 emptying into the next funnel 132 directly below it, as shown in FIG. 18. The upper funnel 130 is connected to support ring 134 of stand 136 by support cords 138 having hooks 140 at the ends thereof, in the same manner as the other funnel configuration described above. Lower funnel 132 is connected to upper funnel 130 by support cords 142 and attached hooks 144 and 146 at the upper and lower ends. In the illustrated embodiment, the lower funnel empties into beaker 148. In practice, however, any number of funnels could be connected in series. The solution for the emptying times of all the funnels is an exercise in differential equations.

The funnel teaching system is utilized at three levels in a school system: the curriculum development level, the teaching level, and the student level. The developers of the curriculum of the school system inspect the various facets and complexity gradations of the funnel teaching system and incorporate it, as a project or otherwise, into their curriculum. A teacher enjoys many optional teaching strategies with the funnel teaching system, including opportunities to develop theory along the lines necessary to solve for *flow characteristics, such as for* the time duration of fluid flow from the funnels, solve the funnels together with the class, divide the class room into groups with the individuals of each group collectively solving one or more funnels, pass out the funnels for the students to take home to solve as homework, have each group or individual present their solution upon the blackboard to the entire class for collective critique, and analogically test the results with actual water flow through the funnels. The students are challenged, for each funnel, with setting up *appropriate formulas, such as setting up* the integral, the integral limits, the instantaneous volumetric increment, and the integrand, integrating the terms, measuring and noting salient physical constants from the funnels plugging in the correct constants, and calculating *the flow characteristics, such as* the emptying time. The analogic verification of the derived results consists in hanging the appropriate funnel from the funnel support system by inserting the four funnel support hooks 29, 30, 31 and 32 of the funnel support system 10 into the appropriate funnel suspension holes 70, 71, 72 and 73 of the funnel, adjusting the funnel height by securing the funnel support ring 20 at a desirable position along the upright arm 12 high enough so that the funnel is able to clear the water receptacle 40 yet low enough so that the water jet does not splash, filling the water receptacle 40 with an adequate volume of water, plugging the funnel orifice 69 with a finger, filling the funnel with water from the water receptacle 40 up to the depth indication line 66 of the funnel, placing the water receptacle 40 underneath the funnel orifice 69 so as to catch the water efflux, noting the position of the sweep hand on a wall clock or watch, removing the plug finger from the funnel orifice 69 and thus allowing the posited volume of water to drain from the funnel, and noting the total efflux time of the water from the funnel. If the analog emptying time for the funnel varies from the calculated results by a significant margin (timing inaccuracies plus the above-specified theoretical simplification inaccuracies), correction to the calculations may be made by an individual student, by collective class critique, or by the instructor.

From the description of the three funnel types, 60,90, and 100, it should be recognized that any yaw, horizontal juxtaposition, and/or vertical permutation of a curvilineal side wall as defined by the above formulas $f_u$ can be employed in the instant invention. The illustrated typical funnels are specific and particularly specific and particularly useful examples of many possible permutations.

Furthermore, it should be evident that the specific horizontal cross-sectional shape of any funnel can be varied, with the shapes herein having been selected for the purpose of setting up an easily manipulable integrand. The instant invention applies to any water-holding vessel of any closed horizontal cross-section, be it polygonal, circular, elliptical, symmetrical, or asymmetrical, arrived at either by cartesian and/or cylindrical coordinates, that is to be used as a teaching aid involving water efflux from it if any elevational cross-section at any vertical elevation and at any yaw rotation shows the inner walls of the vessel to follow the formulas fu of the curvilineal side walls as described above.

Furthermore, the circular orifice shape is arbitrary. Any orifice shape can be accomodated into the calculations with simple modification of the jet discharge equations as was shown above.

Furthermore, the funnel support apparatus can be varied, the present means being one preferred means for supporting the funnels in a stable position.

In addition, the choice of water as the fluid medium is not essential. Any fluid could be used as the flow medium and be accommodated into the calculations with simple modification of the constant to account for changes in the physical characteristics of the fluid.

For more advanced studies in fluid flow, the density (as by adding a solute) and viscosity of the fluid can be changed. Indeed, different, immiscible fluids such as oil and water can be employed in the same funnel. Also, the fluid can be agitated, as by swirling, in order to study the changes caused by the state of movement of the fluid in the integration calculations.

Figure 16:
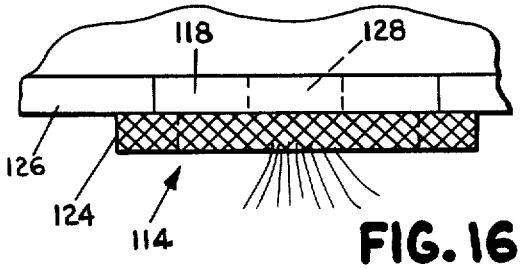
FIG. 16 is a partial side elevational view showing an adjustable iris-closure mounted on the lower end of a funnel.
Figure 17:
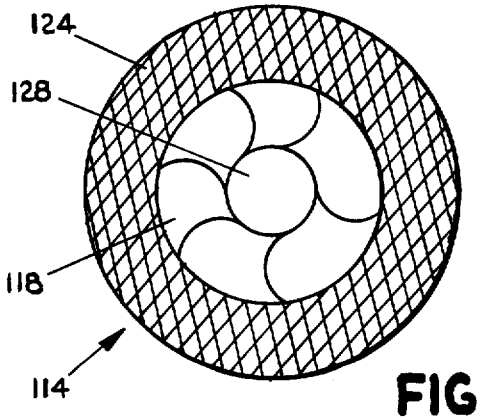
FIG. 17 is a plan view of the iris closure of FIG. 16.

The size of the orifice also can be changed in order to study the effects of these elements in the integration calculation. One way the orifice size can be changed is by insertion of an adjustable iris device 114 in an enlarged orifice 116, as shown in FIGS. 16 and 17. The iris has movable petals 118 that fit in the orifice and a rotatable adjustment ring 124 that extends below the base 126 of the funnel. Rotation of the ring causes the petals to enlarge or reduce the size of the outlet opening 128.

While most of the measurements contemplated herein involve the comparison of calculated versus measured times of the employing of a funnel, comparisons of fluid flow rates also can be obtained by taking a time measured sample (e.g. one second) of fluid efflux from the outlet at a particular height of fluid in the funnel and comparing the measured volume with the mathematically calculated flow rate at that point. The equation for calculating the flow rate "Q" from the orifice at a particular height "h" of liquid in the funnel is:

$$Q = \left(\frac{A}{K}\right)\sqrt{h}$$

Where A is the cross sectional area of the outlet and K is a constant.

Figure 13:
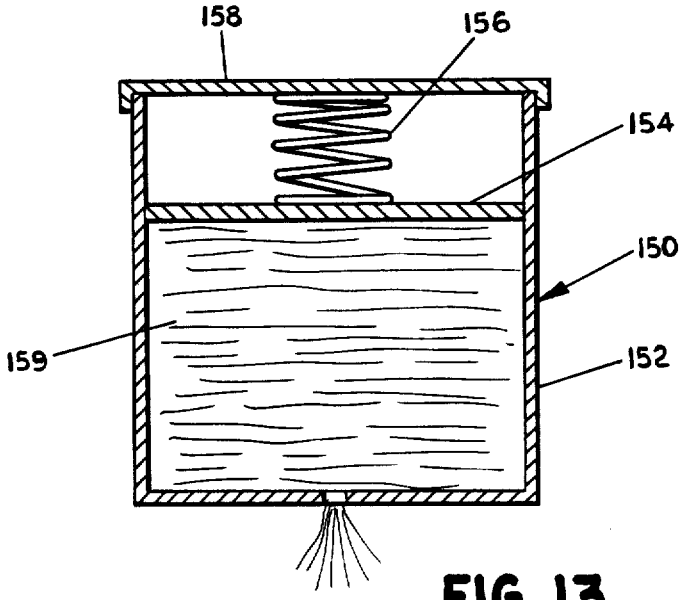
FIG. 13 is an elevational cross-sectional view of a funnel the upper surface of the liquid is pressurized by a spring driven piston.

The funnel systems described above employ open top funnels, with the fluid flowing from the funnels solely under the influence of gravity. For variation in the system the gravity flow can be modified by applying more or less pressure to the upper surface of the liquid in the funnel. In FIG. 13, for example, a funnel 150 having parallel sidewalls 152 is provided with a piston 154 driven by a compressed coil spring 156, which in turn bears against a closed funnel top 158. The additional downward force provided by the spring, which decreases as the height of the liquid 159 drops, requires modification of the mathematical formulas for calculating the funnel emptying time.

Figure 14:
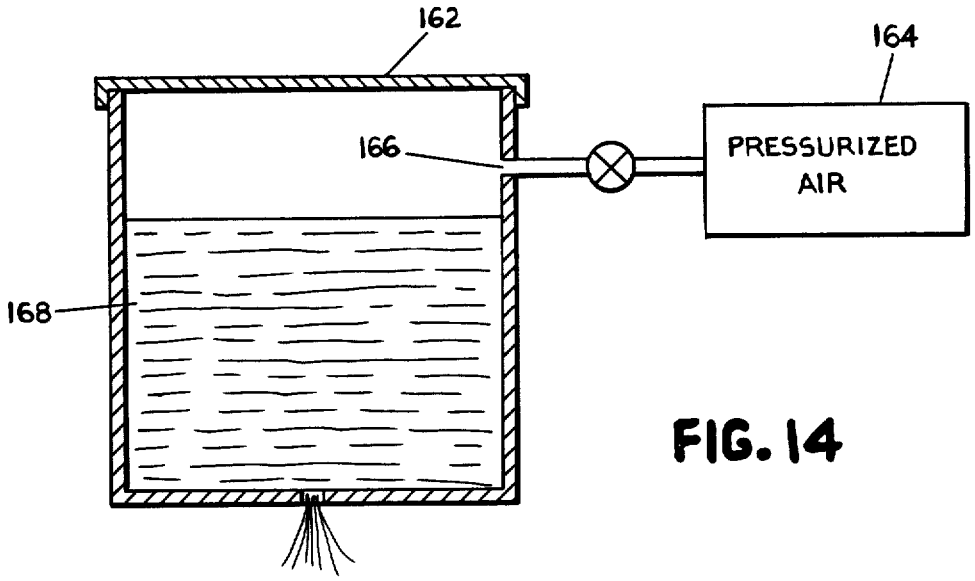
FIG. 14 is an elevational cross-sectional view of a funnel wherein the upper surface of the liquid is pressurized by pressurized air.

In FIG. 14, a funnel 160 with a closed top 162 is pressurized by a pressurized air source 164 through an inlet 166 above liquid 168. The air can be of a constant pressure (wherein pressure is unaffected by the height of the liquid) or it can be of a constant volume (wherein pressure drops as the liquid height drops) Or the pressure could be a partial vacuum. Each variation requires a modification of the corresponding mathematical formula for calculating the *flow characteristics, such as the* efflux time.

From these examples, other modifications will suggest themselves. It is to be understood that the same is offered merely by way of example, and that the instant invention is to be limited only by the scope of the appended claims.

The embodiments of the invention in which an exclusive property or privilege is claimed are defined as follows:

1. A method for teaching physical principles of fluid flow and mathematical principles [of integration] by concrete, measurable examples comprising the steps of: supporting a funnel of predetermined interior configuration in position to receive liquid in an open upper end and discharge the liquid through an outlet orifice in a lower end, the funnel having sidewalls with interior surfaces that conform with mathematical formulas as a function of the distance along the funnel axis that, when inserted in the formula for calculating the time it takes for the funnel to empty, provides a function capable of being integrated *either analytically or numerically;* filling the funnel with a liquid to a preselected level in the funnel; and measuring [the time it takes for all] *a characteristic* of the liquid [to flow] *as said liquid flows* out of the funnel outlet orifice, the measured [time] *characteristic* value being comparable with a [time] *theoretical characteristic* value obtainable theoretically [by integrating the equation for the theoretical time it takes the funnel to empty] *by mathematical formulation*, a comparison of the measured and theoretical values using mathematical [integration] *calculation* providing a concrete experience that facilitates learning the principles of fluid flow, *science* and [integration] *mathematical operations* in terms of abstract symbols.

2. A method according to claim 1 wherein the funnel comprises a closed containment vessel including enclosed perimetric sidewalls and a base with an outlet orifice covering the lower end of the sidewalls, the base restricting streamlined flow through the orifice and maintaining similar characteristics of outlet flow in funnels having different sidewall configurations.

3. A method according to claim 1 wherein the funnel has a rectangular horizontal cross-sectional shape and four sidewalls, three sidewalls being vertical and the fourth sidewall having a curvilinear shape, thereby presenting a simplistic problem for solution by beginning students.

4. A method according to claim 1 wherein the inner surfaces of the funnel correspond to any of the mathematical formulas $x = f_u(y)$, where y is a vertical axis of the funnel, x is the horizontal distance of the inner surface from the y axis for any specific value of y, and $f_u(y)$ is one or more of the functions of y selected from the twenty-eight functions set forth in the present specification.

5. A method according to claim 1 wherein the funnel comprises a polygonal cross-section and is formed of a plurality of interconnected sidewalls, each sidewall having an inner surface formed in accordance with the right cylindrical projection of a graph whose function, when plugged into the formula for computing the time it takes liquid to flow out of the funnel, [yields an] *capable of yielding an analytically or numerically* integrable function.

6. A method according to claim 5 wherein the funnel comprises a rectangular cross section with four curvilinear sidewalls.

7. A method according to claim 1 wherein the funnel has a circular horizontal cross-section, with the configuration of the sidewalls being formed by rotating about the axis of the funnel a graph corresponding with a formula that can be plugged into the equation for calculating the time it takes for the funnel to empty and [yield an] *capable of yielding an analytically or numerically* integrable equation.

8. A method according to claims 5 or 7 wherein the funnel comprises a horizontal juxtaposition of at least one each of the funnel sections of claims 5 or 7, with the equation for each section separately being [integrable] *capable of analytically or numerically integrated* in the formula for calculating the time for emptying the funnel of liquid.

9. A method according to claim 7 wherein the funnel is formed of a horizontal juxtaposition of one or more curvilineal sections, with the equation for each section separately being *capable of being analytically or numerically* integrable in the formula for calculating the time for emptying the funnel of liquid.

10. A method according to claim 1 wherein the funnel is formed of one or more vertical levels joined along horizontal seams, with the equations for the sections of each level being *capable of being analytically or numerically* integrable in the formula for calculating the time for emptying the funnel of liquid.

11. A method according to claim 1 wherein a funnel includes one or more occlusions in its interior, with the occlusions being formed of any combination of shapes that correspond to equations that, when plugged into the time equation, yield an [integrable] integrand *capable of being analytically or numerically integrated.*

12. A method according to claim 1 wherein the orifice of the funnel contains an iris closure capable of variating the effective size of the orifice.

13. A method according to claim 1 wherein the fluid medium draining from the funnel is any liquid, any solution of a liquid and a solute, any solution of liquids, or any number of immiscible liquids.

14. A method according to claim 1 wherein a number of funnels are arranged in series with the efflux of one funnel draining into the next.

15. A method according to claim 1 wherein the outlet orifice is positioned at a predetermined distance from the sidewalls of the funnel, with said distance being such as to maximize the correlation between the measured and mathematically calculated times for the funnel to empty.

16. A method according to claim 1 wherein the outlet orifice is contoured so as to maximize the correlation between the measured and mathematically calculated times for the funnel to empty.

17. A method according to claim 1 wherein the method employs a plurality of funnels of varying shapes and support means for supporting each funnel in a stable, vertical position while demonstrating the time it takes liquid to flow from the funnel.

18. A method according to claim 1 wherein the funnel includes a base enclosing the bottom end of the funnel, an outlet orifice of predetermined size being formed in the base, the base restricting streamlined flow through the orifice and maintaining similar characteristics of outlet flow in funnels having different sidewall configurations.

19. A method according to claim 1 wherein the area of the outlet orifice together with the configuration of the funnel are such that when the funnel is filled with liquid to its predetermined depth, the time for the funnel to empty by the liquid flowing through the orifice under gravity is about ten (10) to sixty (60) seconds.

20. A method according to claim 1 and further comprising closing the upper end of the funnel after filling the funnel and applying pressure other than atmospheric pressure to the upper surface of the liquid so as to vary the conditions of the fluid flow.

21. Teaching apparatus for teaching the principles of fluid flow [and integration] *science and mathematics* in terms of fluid flow comprising one or more funnels having enclosed sidewalls and an inlet and outlet at respective upper and lower ends, the mathematical equations for the sidewalls being functions of the distance along a vertical axis of the funnel and being such that when the equations are plugged into the formula for computing the time it takes liquid to flow out of the funnel, the resultant function is [integration] *capable of being analytically or numerically integrated*, the funnel having a predetermined and known mathematical configuration and known shape and flow characteristics for a given liquid such that physical measurement of the time it takes for the liquid to flow from the funnel can be substantially duplicated by inserting the equation for the funnel sidewalls into the formula for theoretically calculating [the time it takes for the funnel to empty] *a flow characteristic of said funnel as said funnel empties* and [integrating] *performing mathematical operations thereon*; the apparatus further including support means for supporting the funnel in a stable position, with the axis of the funnel maintained in a generally vertical position.

22. Teaching apparatus according to claim 21 wherein the equations for the interior surfaces of the sidewalls at each point in the sidewalls about a funnel axis conform with one or more of the twenty-eight functions set forth in the present specification.

23. Teaching apparatus according to claim 21 wherein the funnel comprises a polygonal cross-section and is formed of a plurality of interconnected sidewalls, each sidewall having an inner surface formed in accordance with the right cylindrical projection of a graph whose function, when plugged into the formula for computing [the time it takes liquid to flow out of the funnel] *said flow characteristic* yields an [integrable] function *capable of being analytically or numerically integrated.*

24. Teaching apparatus according to claim 23 wherein the funnel comprises a rectangular cross-section with four curvilinear sidewalls.

25. Teaching apparatus according to claim 23 wherein the funnel comprises a rectangular cross section and has three vertical side sidewalls and one curvilinear sidewall, thereby presenting a simplistic problem for solution by beginning students.

26. Teaching apparatus according to claim 21 wherein the funnel has a circular horizontal cross-section, with the configuration of the sidewalls being formed by rotating about an axis of the funnel a graph corresponding with a formula that can be plugged into the equation for calculating [the time it takes for the funnel to empty] *said flow characteristic* and yield an

[integrable] equation *capable of being analytically or numerically integrated.*

27. Teaching apparatus according to claim 21 wherein the inner surfaces of the funnel correspond to any of the mathematical formulas $x=f_u(y)$, where y is any vertical axis of the funnel, x is the horizontal distance of a surface from the y axis for any specific value of y, and $f_u(y)$ is one or more of the functions of y selected from the twenty-eight functions set forth in the present specification.

28. Teaching apparatus according to claims 23 or 26 wherein the funnel is formed of a horizontal juxtaposition of at least one each of the funnel sections of claims 23 or 26, with the equation for each section separately being integrable in the formula for calculating the time for emptying the funnel of liquid.

29. Teaching apparatus according to claim 26 wherein the funnel is formed of a horizontal juxtaposition of one or more curvilineal sections, with the equation for each section separately being [integral] *capable of being analytically or numerically integrated* in the formula for calculating [the time for emptying the funnel of liquid] *said flow characteristic.*

30. Teaching apparatus according to claim 21 wherein the funnel is formed of one or more vertical levels joined along horizontal seams, with the equations for the sections of each level being [integrable] *capable of being analytically or numerically integrated* in the formula for calculating [the time for emptying the funnel of liquid] *said flow characteristic.*

31. Teaching apparatus according to claim 21 wherein the apparatus includes a plurality of funnels of varying shapes and support means for supporting each funnel in a stable, vertical position while demonstrating the time it takes liquid to flow from the funnel.

32. Teaching apparatus according to claim 21 wherein the funnel includes a base enclosing the bottom end of the funnel, an outlet orifice of predetermined size being formed in the base, the base restricting streamlined flow through the orifice and maintaining similar characteristics of outlet flow in funnels having different sidewall configurations.

33. Teaching apparatus according to claim 32 wherein the orifice is positioned a predetermined distance from the sidewalls of the funnel, with the distance being selected so as to maximize the correlation between the measured and mathematically calculated times for the funnel to empty.

34. Teaching apparatus according to claim 21 wherein the area of the outlet orifice together with the configuration of the funnel are such that when the funnel is filled with liquid to its predetermined depth, the time for the funnel to empty by the liquid flowing through the orifice under gravity is about ten (10) to sixty (60) seconds.

35. Teaching apparatus according to claim 21 wherein a funnel includes any number of occlusions in its interior, with the occlusions being formed of any combination of shapes that correspond to equations that, when plugged into the [time] equation *for calculating said flow characteristic,* yield an [integrable] integrand *capable of being analytically or numerically integrated.*

36. Teaching apparatus according to claim 21 wherein the orifice of the funnel contains an iris closure capable of variating the effective size of the orifice.

37. Teaching apparatus according to claim 21 wherein the fluid medium draining from the funnel is any liquid, any solution of a liquid and a solute, any solution of liquids, or any number of immiscible liquids.

38. Teaching apparatus according to claim 21 wherein a number of funnels are arranged in series with the efflux of one funnel draining into the next.

39. Teaching apparatus according to claim 21 wherein the outlet orifice is positioned at a predetermined distance from the sidewalls of the funnel, with said distance being such as to maximize the correlation between the measured and mathematically calculated times for the funnel to empty.

40. Teaching apparatus according to claim 21 wherein the outlet orifice is contoured so as to maximize the correlation between the measured and mathematically calculated times for the funnel to empty.

41. Teaching apparatus according to claim 21 and further comprising means for closing the open upper end of the funnel after filling the funnel; and means for applying pressure other than atmospheric pressure to the upper surface of the liquid so as to vary the conditions of the liquid flow.

*42. A method according to claim 1 wherein said supporting step includes supporting a funnel having sidewalls configured such that said function provided is capable of being analytically or numerically integrated, said flow characteristic measuring step includes the measured flow characteristic value being comparable with a flow characteristic value obtainable theoretically by manipulating the equation for the theroetical time it takes the funnel to empty.*

*43. A method according to claim 4 wherein said supporting step includes supporting a funnel having sidewalls configured such that said function provided is capable of being analytically or numerically integrated, said flow characteristic measuring step includes the measured flow characteristic value being comparable with a flow characteristic value obtainable theoretically by manipulating the equation for the theoretical time it takes the funnel to empty.*

*44. An apparatus according to claim 21 wherein said funnel is configured such that said resultant function is analytically or numerically integrable and the physical measurement of said flow characteristic can be substantially duplicated by inserting the equation for the funnel sidewalls into the formula for theoretically calculating said flow characteristic and solving said calculation.*

*45. An apparatus according to claim 22 wherein said funnel is configured such that said resultant function is analytically or numerically integrable and the physical measurement of said flow characteristic can be substantially duplicated by inserting the equation for the funnel sidewalls into the formula for theoretically calculating said flow characteristic and solving said calculation.*

*46. An apparatus according to claim 27 wherein said funnel is configured such that said resultant function is analytically or numerically integrable and the physical measurement of said flow characteristic can be substantially duplicated by inserting the equation for the funnel sidewalls into the formula for theoretically calculating said flow characteristic and solving said calculation.*

* * * * *